United States Patent [19]

Defieuw et al.

[11] Patent Number: 5,432,040
[45] Date of Patent: Jul. 11, 1995

[54] DYE-DONOR ELEMENT FOR USE ACCORDING TO THERMAL DYE SUBLIMATION TRANSFER

[75] Inventors: Geert Defieuw, Kessel-Lo; Luc Vanmaele, Lochristi; Wilhelmus Janssens, Aarschot, all of Belgium

[73] Assignee: AGFA-Gevaert, N.V., Mortsel, Belgium

[21] Appl. No.: 67,010

[22] Filed: May 26, 1993

[30] Foreign Application Priority Data

Jul. 14, 1992 [EP] European Pat. Off. ............ 92202155

[51] Int. Cl.⁶ .................. B41M 5/035; B41M 5/38
[52] U.S. Cl. .................... 430/200; 430/201; 503/227; 8/471; 428/195
[58] Field of Search ............... 8/471; 430/200, 201; 503/227; 428/195

[56] References Cited

U.S. PATENT DOCUMENTS

| | | |
|---|---|---|
| 4,857,503 | 8/1989 | Jongewaard et al. ............. 428/914 |
| 4,985,396 | 1/1991 | Kawakami et al. ................. 503/227 |
| 4,999,026 | 3/1991 | Albert et al. ............................ 8/471 |
| 5,011,812 | 4/1991 | Bradburg ................................. 8/471 |
| 5,041,412 | 8/1991 | Chapman et al. ................... 430/200 |
| 5,077,264 | 12/1991 | Hayashi et al. ..................... 503/227 |
| 5,169,828 | 12/1992 | Janssens et al. ..................... 503/227 |
| 5,177,052 | 1/1993 | Ambro et al. ....................... 430/201 |
| 5,185,315 | 2/1993 | Sparer .................................. 503/227 |
| 5,202,176 | 4/1993 | Higuchi et al. ...................... 428/195 |
| 5,221,658 | 6/1993 | Bach et al. ........................... 503/227 |

FOREIGN PATENT DOCUMENTS 0442360 8/1991 European Pat. Off. .

Primary Examiner—Charles L. Bowers, Jr.
Assistant Examiner—Martin J. Angebranndt
Attorney, Agent, or Firm—Breiner & Breiner

[57] ABSTRACT

Dye-donor element comprising a support provided with a dye layer containing a cyan indoaniline dye and-/or another cyan azomethine dye, together with a cyan thiazolylazoaniline dye.

10 Claims, No Drawings

DYE-DONOR ELEMENT FOR USE ACCORDING TO THERMAL DYE SUBLIMATION TRANSFER

FIELD OF THE INVENTION

The present invention relates to dye-donor elements for use according to thermal dye sublimation transfer.

BACKGROUND OF THE INVENTION

Thermal dye sublimation transfer also called thermal dye diffusion transfer is a recording method in which a dye-donor element provided with a dye layer containing sublimating dyes having heat transferability is brought into contact with a receiver sheet and selectively, in accordance with a pattern information signal, heated with a thermal printing head provided with a plurality of juxtaposed heat-generating resistors, whereby dye from the selectively heated regions of the dye-donor element is transferred to the receiver sheet and forms a pattern thereon, the shape and density of which is in accordance with the pattern and intensity of heat applied to the dye-donor element.

A dye-donor element for use according to thermal dye sublimation transfer usually comprises a very thin support e.g. a polyester support, one side of which is covered with a dye layer, which contains the printing dyes. Usually an adhesive or subbing layer is provided between the support and the dye layer. Normally the opposite side is covered with a slipping layer that provides a lubricated surface against which the thermal printing head can pass without suffering abrasion. An adhesive layer may be provided between the support and the slipping layer.

The dye layer can be a monochrome dye layer or it may comprise sequential repeating areas of different colored dyes like e.g. of cyan, magenta, yellow and optionally black hue. When a dye-donor element containing three or more primary color dyes is used, a multicolor image can be obtained by sequentially performing the dye transfer process steps for each color.

Many of the dyes proposed for use in thermal dye sublimation transfer are not sufficient in performance because they yield inadequate transfer densities at reasonable coating coverages. Especially for transfer on transparent film materials as receiving element, the transfer densities obtained are too low.

For obtaining sufficient cyan densities on transparent film receiving elements the class of the so-called indoaniline dyes (as described e.g. in U.S. Pat. No. 4,829,047) and the class of cyan dyes as described in U.S. Pat. No. 5,026,677 are well suited.

A primary colored dye layer, for example, a magenta or cyan or yellow dye layer, may comprise only one primary colored dye (a magenta, cyan or yellow dye respectively) or may comprise a mixture of two or more primary colored dyes of the same hue (two magenta, two cyan or two yellow dyes respectively).

The so-called additive colors green, red and blue in the obtained prints are realised by printing sequentially the primary colors on each other; thus a green color on the print is obtained by printing sequentially cyan and yellow colored dyes, blue by printing sequentiallly cyan and magenta colored dyes. So in fact these shades consist of mixtures of dyes.

Dye images containing mixtures of dyes frequently show an increased fading rate due to a photochemical effect, known as catalytic fading of dye mixtures.

This phenomenon was investigated in textile dyeing by Rembold and Kramer (see Journal of the Society of Dyers and Colourists, vol. 94 (1978), pages 12–17) and by Asquith and Ingham (see Journal of the Society of Dyers and Colourists, vol.89 (1973), pages 81–85). Catalytic fading is related to the observation that the lightfastness of certain dyes applied to textiles alone is much better than when applied as mixtures. In most reported cases, the lightfastness of cyan, violet or red dyes deteriorates when a yellow dye is added.

Indoaniline dyes have a favourable effect on catalytic fading especially in dye mixtures for obtaining black colored images. However there are still strong catalytic fading effects in the green colored images composed of yellow and cyan dyes, with cyan indoaniline dyes as well as with other cyan azomethine dyes. Moreover, many indoaniline dyes have poor light stability.

Therefore, it is an object of the present invention to provide dye-donor elements, in particular cyan dye donor elements yielding transferred dye images of high density showing no or decreased catalytic fading effects in the green colored image areas.

It is another object of the present invention to provide cyan dye-donor elements, containing mixtures of cyan colored dyes, yielding transferred cyan dye images showing improved light stability.

Other objects will become apparent from the description given hereinafter.

SUMMARY OF THE INVENTION

These and other objects are achieved by using a dye-donor element comprising a support provided with a dye layer containing a cyan indoaniline dye and/or another cyan azomethine dye, characterized in that said dye layer further contains a cyan thiazolylazoaniline dye.

Dye-donor elements according to the present invention yield transferred images of high density, showing less catalytic fotofading in the green colored image areas and improved light stability.

DETAILED DESCRIPTION OF THE INVENTION

Cyan thiazolylazoaniline dyes for use according to the present invention correspond to the following general formula (I):

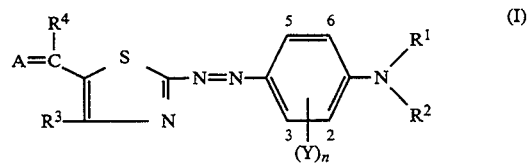

wherein

A represents O, N—$R^5$, $CR^6R^7$;

Y represents any substituent, e.g. SH, OH, halogen, $NO_2$, CN, alkyl, aryl, amino, carbonamido, sulfonamido, acylamino, alkoxy, thioalkoxy;

n represents 0, 1, 2, 3 or 4, the Y substituents being the same or different when n is greater than 1;

each of $R^1$ to $R^2$ (same or different) represent hydrogen, an alkyl group, a cycloalkyl group or an aryl group, which groups may be substituted, or $R^1$ and $R^2$ may be joined together to form a 5- or 6-membered heterocyclic ring system which may be substituted, or each of $R^1$ and $R^2$ independently can be joined to the carbon atom of the aromatic ring at a position ortho to the position of attachment of the anilino nitrogen to form a 5- or 6-membered ring, which ring may be substituted;

$R^3$ represents a substituent, preferentially halogen, $OR^{10}$, $SR^{10}$;

$R^4$ represents hydrogen or an electron withdrawing substituent e.g. CN, halogen, nitro, alkoxycarbonyl, alkylcarbonyl;

$R^5$ represents H, CN, $NR^8R^9$, $OR^8$, $OCOR^8$, $OCOOR^8$, $OCONR^8R^9$, $CSO_2R^8$, $OPO(OR^8)(OR^9)$;

$R^6$ and $R^7$ (same or different) represent an electron withdrawing group such as CN, $CO_2R^8$, $CONR^8R^9$, $NO_2$, $COR^8$, $PO(OR^8)(OR^9)$, $SO_2R^8$, $SO_3R^8$;

$R^8$ and $R^9$ (same or different) represent hydrogen, substituted or unsubstituted alkyl, substituted or unsubstituted aryl, substituted or unsubstituted cycloalkyl or $R^8$ and $R^9$ together represent the atoms necessary for completing a heterocyclic nucleus or substituted heterocyclic nucleus;

$R^{10}$ represents hydrogen, substituted or unsubstituted alkyl, substituted or unsubstituted cycloalkyl, substituted or unsubstituted aryl.

Preferably $R^1$ and $R^2$ represent an alkyl group (e.g. butyl, ethyl, hexyl), $R^3$ represents halogen (e.g. chlorine) or alkoxy (e.g. methoxy), $R^4$ represents hydrogen or cyano, A represents O or $CR^6R^7$ with $R^6$ representing CN and $R^7$ representing alkoxycarbonyl or amido, n represents 0 or 1 with Y representing alkyl or alkoxy or halogen or alkylsulfonamino or alkylcarbonylamino or arylsulfonylamino generally in the 3-position.

Dyes corresponding to formula (I) generally have a blue to cyan hue and can be prepared according to the methods described in U.S. Pat. No. 4,395,544, 4,505,857, EP 442360, EP 201896 and in our copending European patent application filed on the same day as the present application.

Examples of suitable thiazolylazoaniline dyes according to the general formula (I) are listed in table 1 below together with their wavelength of maximum absorption ($\lambda_{max}$) and extinction coefficient ($\epsilon$), both measured in methanol.

TABLE 1

| Dye | $R^1$ | $R^2$ | $R^3$ | $R^4$ | A | Y | $\epsilon$ (1 mol$^{-1}$cm$^{-1}$) | $\lambda_{max}$ (nm) |
|---|---|---|---|---|---|---|---|---|
| D1 | $C_4H_9$ | $C_4H_9$ | Cl | H | NC–C–NC | — | $7,16.10^4$ | 642 |
| D2 | $C_4H_9$ | $C_4H_9$ | Cl | H | NC–C–$H_5C_2OOC$ | — | $3,78.10^4$ | 626 |
| D3 | $C_4H_9$ | $C_4H_9$ | Cl | H | NC–C–NC | 3-$CH_3$ | $6,75.10^4$ | 656 |
| D4 | $C_4H_9$ | $C_4H_9$ | Cl | H | NC–C–$H_2NCO$ | — | $6,21.10^4$ | 617 |
| D5 | $C_4H_9$ | $C_4H_9$ | Cl | H | NC–C–NC | 3-$NHSO_2CH_3$ | $5,15.10^4$ | 631 |
| D6 | $C_4H_9$ | $C_4H_9$ | Cl | H | NC–C–NC | 3-$NHCOCH_3$ | $7,00.10^4$ | 637 |
| D7 | $C_4H_9$ | $C_4H_9$ | Cl | H | NC–C–NC | 3-NH—$O_2$S—C$_6$H$_4$—$CH_3$  | $6,99.10^4$ | 640 |
| D8 | $C_4H_9$ | $C_4H_9$ | Cl | H | NC–C–NC | 3-Cl | $5,36.10^4$ | 627 |

TABLE 1-continued

| | | | | | | | | |
|---|---|---|---|---|---|---|---|---|
| D9 | $C_2H_5$ | $C_2H_5$ | Cl | H | $\begin{array}{c}NC\\ \diagdown\\ C\\ \diagup\\ NC\end{array}$ | 3-NH—$O_2$S—C$_6$H$_4$—CH$_3$ | $3,05.10^4$ | 634 |
| D10 | $C_6H_{13}$ | $C_6H_{13}$ | Cl | H | $\begin{array}{c}NC\\ \diagdown\\ C\\ \diagup\\ NC\end{array}$ | — | $7,24.10^4$ | 641 |
| D11 | $C_6H_{13}$ | $C_6H_{13}$ | Cl | H | $\begin{array}{c}NC\\ \diagdown\\ C\\ \diagup\\ H_5C_2OOC\end{array}$ | 3-$CH_3$ | $6,81.10^4$ | 638 |
| D12 | $C_6H_{13}$ | $C_6H_{13}$ | Cl | H | $\begin{array}{c}NC\\ \diagdown\\ C\\ \diagup\\ H_5C_2OOC\end{array}$ | — | $6,09.10^4$ | 626 |
| D13 | $C_6H_{13}$ | $C_6H_{13}$ | Cl | H | $\begin{array}{c}NC\\ \diagdown\\ C\\ \diagup\\ H_2NOC\end{array}$ | 3-$CH_3$ | $6,63.10^4$ | 631 |
| D14 | $C_4H_9$ | $C_4H_9$ | $CH_3O$ | H | $\begin{array}{c}NC\\ \diagdown\\ C\\ \diagup\\ NC\end{array}$ | — | $6,11.10^4$ | 650 |
| D15 | $C_4H_9$ | $C_4H_9$ | $CH_3O$ | H | $\begin{array}{c}NC\\ \diagdown\\ C\\ \diagup\\ H_5C_2OOC\end{array}$ | — | $5,21.10^4$ | 633 |
| D16 | $C_4H_9$ | $C_4H_9$ | Cl | H | $\begin{array}{c}NC\\ \diagdown\\ C\\ \diagup\\ NC\end{array}$ | 3-$CH_3O$ | $7,41.10^4$ | 647 |
| D17 | $C_4H_9$ | $C_4H_9$ | $CH_3O$ | CN | $\begin{array}{c}NC\\ \diagdown\\ C\\ \diagup\\ NC\end{array}$ | — | $7,34.10^4$ | 720 |
| D18 | $C_2H_5$ | $C_2H_4O$-C$_6$H$_4$-C$_6$H$_{11}$ | Cl | H | $\begin{array}{c}NC\\ \diagdown\\ C\\ \diagup\\ NC\end{array}$ | 3-$CH_3$ | $6,57.10^4$ | 644 |
| D19 | (CN)$_2$=CH—[thiazole-Cl,S,N]—N=N—[phenyl with N(CH$_3$) and CH=C(CH$_3$)C(CH$_3$)$_3$] | | | | | | $4,02.10^4$ | 678 |

TABLE 1-continued

| | | | |
|---|---|---|---|
| D20 | [structure] | $4,08.10^4$ | 622 |
| D21 | [structure] | $4,63.10^4$ | 613 |
| D22 | [structure] | $6,55.10^4$ | 623 |
| D23 | [structure] | $4,65.10^4$ | 649 |
| D24 | [structure] | $7,45.10^4$ | 722 |
| D25 | [structure] | $5,75.10^4$ | 647 |
| D26 | [structure] | $6,45.10^4$ | 719 |

TABLE 1-continued
| | | | |
|---|---|---|---|
| D27 | 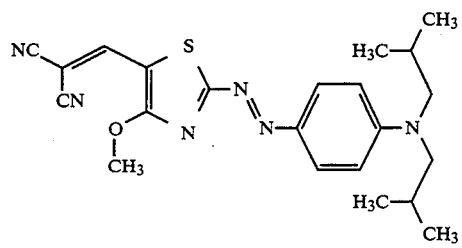 | $6,01.10^4$ | 647 |
| D28 | 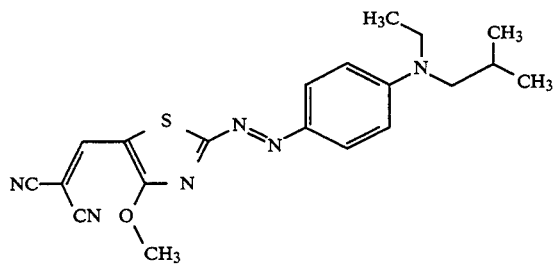 | $4,37.10^4$ | 641 |
| D29 | 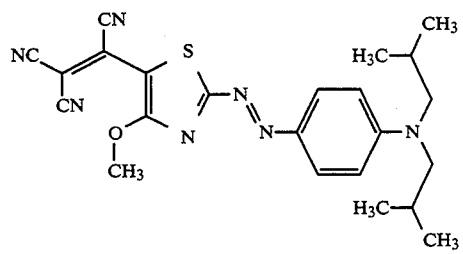 | $8,47.10^4$ | 720 |
| D30 | 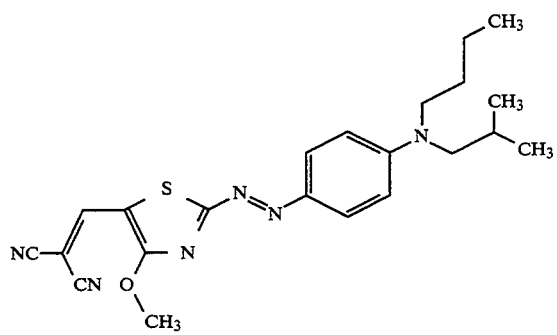 | $5,94.10^4$ | 649 |
| D31 | 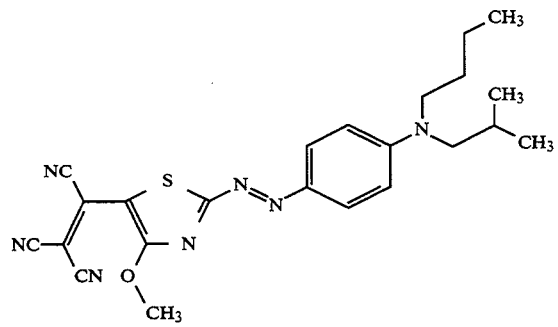 | $7,59.10^4$ | 721 |

TABLE 1-continued

D32 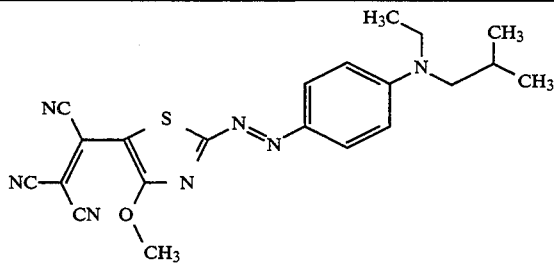 7,54.10⁴ 721

In a particular embodiment of the present invention the dyes according to the formula (I) are used in admixture with cyan indoaniline dyes corresponding to the following general formula (II):

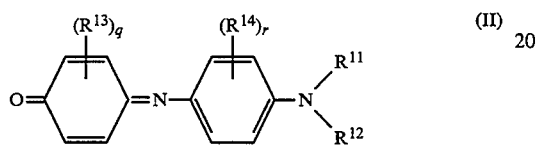 (II)

wherein:

$R^{11}$ and $R^{12}$ (same or different) represent hydrogen, an alkyl group, a cycloalkyl group, an aryl group, an allyl group or an alkenyl group, which groups may be substituted, or $R^{11}$ and $R^{12}$ together with the nitrogen to which they are attached form the necessary atoms to close a 5- or 6-membered heterocyclic ring, which ring may be substituted, or $R^{11}$ and/or $R^{12}$ together with the nitrogen to which they are attached and either or both carbon atoms of the phenyl ring ortho to said nitrogen atom form a 5- or 6-membered heterocyclic ring, which ring may be substituted;

$R^{13}$ represents halogen, hydroxy, cyano, an alkyl group, a cycloalkyl group, an aryl group, an alkoxy group, an aryloxy group, an alkylthio group, an arylthio group, an amino group, a di(alkyl or aryl)amino group, an alkylcarbonylamino group, an arylcarbonylamino group, an arylsulfonylamino group, an alkoxycarbonylamino group, an aryloxycarbonylamino group, an alkylthiocarbonylamino group, an arylthiocarbonylamino group, an alkylphosphoramidate group, an arylphosphoramidate group, an alkylphosphonamidate group, an arylphosphonamidate group, an alkylaminocarbonyl group or an arylaminocarbonyl group, which groups may be substituted, or $R^{13}$ represents the necessary atoms to close an alicyclic or aromatic or heterocyclic ring (which rings may be substituted) fused-on the phenylene ring;

q represents 0, 1, 2, 3 or 4, the $R^{13}$ substituents may be the same or different when q is greater than 1;

$R^{14}$ can have any of the significances given to $R^{13}$ or can represent the necessary atoms to close an alicyclic or aromatic or heterocyclic ring (which ring may be substituted) fused-on the phenyl ring;

r represents 0, 1, 2, 3 or 4, the $R^{14}$ substituents may be the same or different when r is greater than 1.

Preferably $R^{11}$ and $R^{12}$ both represent alkyl (e.g. ethyl), q represents 1 or 3, $R^{13}$ represents alkylcarbonylamino (which may be substituted) generally in ortho position to the oxygen and/or $R^{13}$ represents the necessary atoms to close an aromatic ring fused-on the phenylene ring, r represents 0 or 1 and $R^{14}$ represents alkyl (e.g. methyl) generally in meta position to the anilino nitrogen.

Examples of suitable indoaniline dyes corresponding to the general formula (II) are listed in table 2 below.

TABLE 2

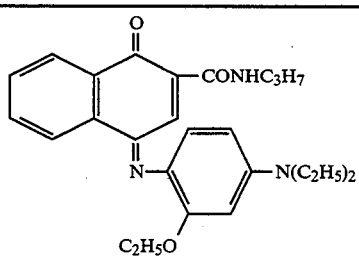 C₁

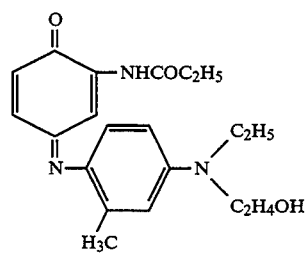 C₂

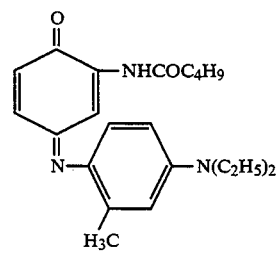 C₃

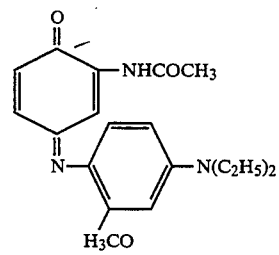 C₄

TABLE 2-continued
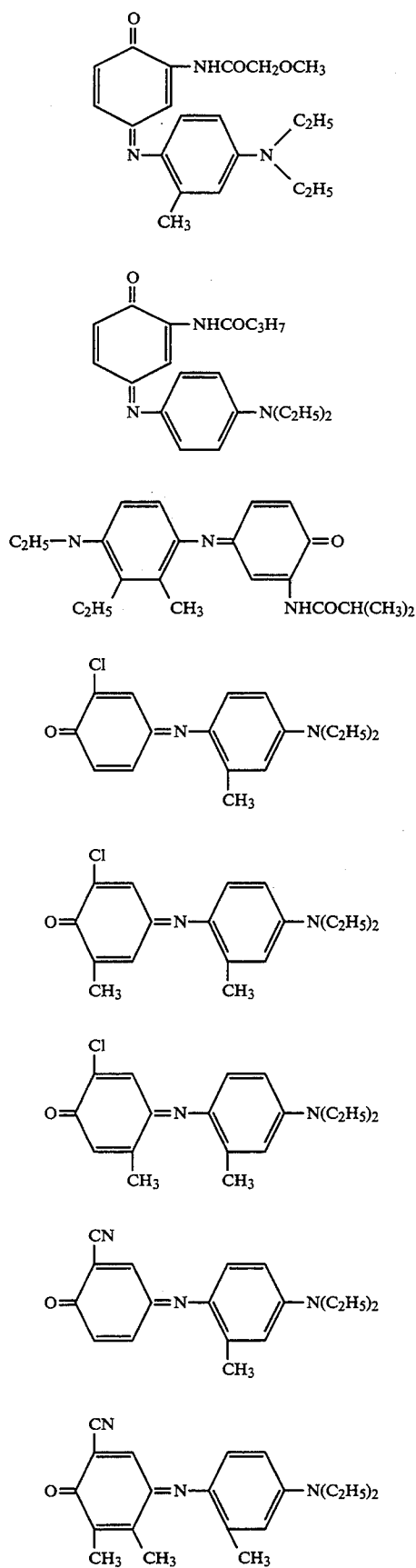
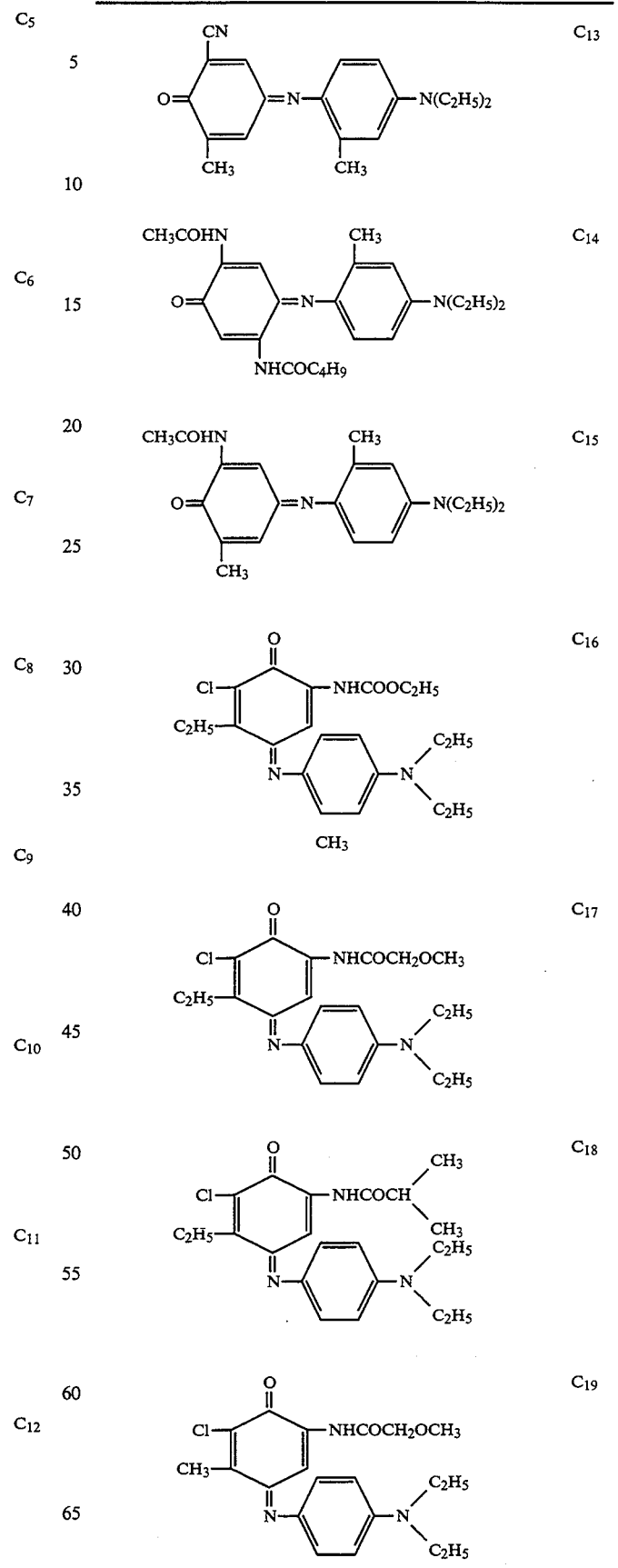

TABLE 2-continued

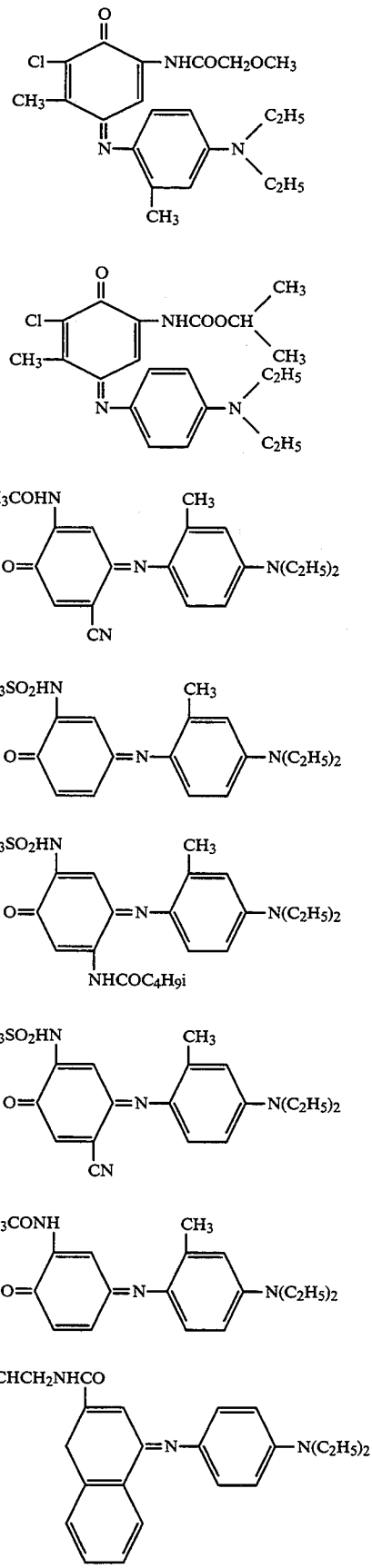

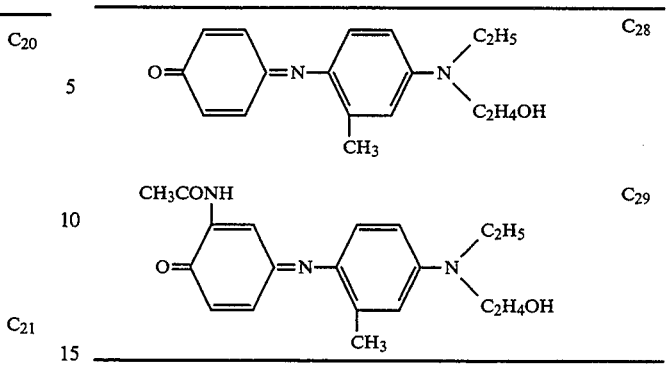

In table 3 are listed absorption maxima ($\lambda_{max}$) and extinction coefficients ($\epsilon$) of some of the cyan dyes listed in table 2, measured in methanol.

TABLE 3

| dye | $\lambda_{max}$ (nm) | $\epsilon$ (l mol$^{-1}$ cm$^{-1}$) |
| --- | --- | --- |
| C5 | 654 | 28469 |
| C8 | 670 | 38297 |
| C18 | 655 | 27715 |
| C22 | 707 | 31100 |
| C27 | 674 | 29869 |
| C26 | 651 | 26200 |

According to another embodiment of the present invention the dyes according to formula (I) are used in admixture with other cyan azomethine dyes according to general formula (III)

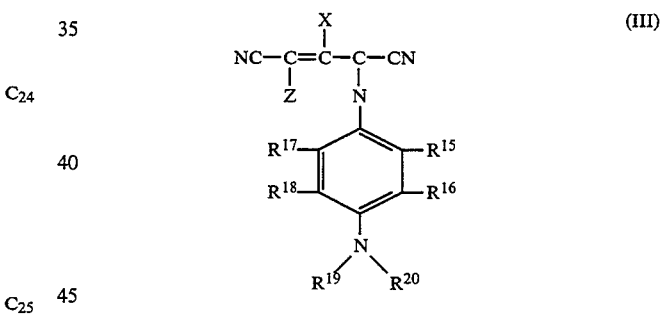

wherein:

X represents OR$^{21}$ or NR$^{22}$R$^{23}$ or CN;

Z represents CN, COOR$^{24}$ or CONR$^{25}$R$^{26}$;

R$^{15}$, R$^{16}$ R$^{17}$ and R$^{18}$ each independently represent hydrogen, substituted or unsubstituted alkyl, substituted or unsubstituted cycloalkyl, substituted or unsubstituted aryl, substituted or unsubstituted alkoxy, substituted or unsubstituted aryloxy, substituted or unsubstituted carbonamido, substituted or unsubstituted sulfamido, hydroxy, halogen, NH—SO$_2$R$^{27}$, NH—COR$^{27}$, OSO$_2$R$^{27}$, OCOR$^{27}$, or R$^{15}$ and R$^{16}$ together and/or R$^{17}$ and R$^{18}$ together represent the necessary atoms to close (a) substituted or unsubstituted ring(s) fused-on the benzene ring or R$^{16}$ and/or R$^{18}$ together with R$^{20}$ and/or R$^{19}$ represent the necessary atoms to close a substituted or unsubstituted heterocyclic ring fused-on the benzene ring;

R$^{19}$ and R$^{20}$ each independently represent hydrogen, substituted or unsubstituted alkyl, substituted or unsubstituted cycloalkyl, substituted or unsubstituted aryl, a substituted or unsubstituted heterocyclic group or R$^{19}$ and R$^{20}$ together represent the necessary atoms to close a substituted or unsubstituted heterocyclic ring or $R^{20}$ and/or $R^{19}$ together with $R^{16}$ and/or $R^{18}$ represent the necessary atoms to close a substituted or unsubstituted heterocyclic ring fused-on the benzene ring; $SO_2R^{27}$, $COR^{27}$, $CSR^{27}$, $POR^{27}R^{28}$;

$R^{21}$ represents hydrogen, substituted or unsubstituted alkyl, substituted or unsubstituted cycloalkyl, substituted or unsubstituted aryl, $R^{22}$ and $R^{23}$ each independently represent hydrogen, substituted or unsubstituted alkyl, substituted or unsubstituted cycloalkyl, substituted or unsubstituted aryl, substituted or unsubstituted amino, $SO_2R^{27}$, $COR^{27}$, $CSR^{27}$, $POR^{27}R^{28}$, or $R^{22}$ and $R^{23}$ together represent the necessary atoms to close a substituted or unsubstituted heterocyclic ring, including a heterocyclic ring with an aliphatic or aromatic ring fused-on;

$R^{24}$, $R^{25}$ and $R^{26}$ each independently represent hydrogen substituted or unsubstituted alkyl, substituted or unsubstituted cycloalkyl, substituted or unsubstituted aryl, or $R^{25}$ and $R^{26}$ together represent the necessary atoms to close a substituted or unsubstituted heterocyclic ring;

$R^{27}$ and $R^{28}$ each independently represent substituted or unsubstituted alkyl, substituted or unsubstituted cycloalkyl, substituted or unsubstituted alkenyl, substituted or unsubstituted aralkyl, substituted or unsubstituted aryl, substituted or unsubstituted alkoxy, substituted or unsubstituted aryloxy, substituted or unsubstituted alkylthio, substituted or unsubstituted arylthio, substituted or unsubstituted amino, a substituted or unsubstituted heterocyclic group or $R^{27}$ and $R^{28}$ together represent the necessary atoms to close a 5- or 6-membered ring.

Preferably X represents $NR^{22}R^{23}$, Z represents CN, $R^{19}$ and $R^{20}$ both represent alkyl (e.g. ethyl), $R^{16}$, $R^{17}$ and $R^{18}$ represent hydrogen $R^{15}$ represents alkylcarbonylamino.

Table I of U.S. Pat. No. 5,026,677 gives a list of color dyes according to general formula III.

Examples of suitable dyes according to formula III are

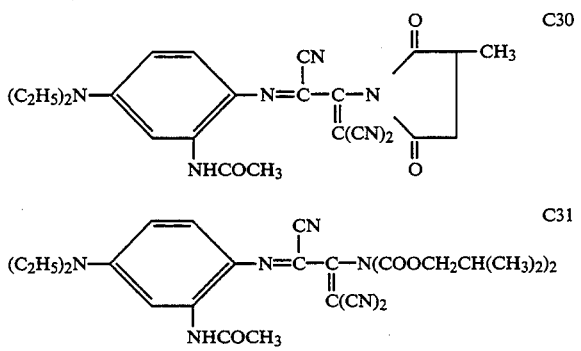

A preferred combination of cyan dyes according to the present invention is D14 and C30, D14 and C31, D14 and C5, D23 and C30, D23 and C31 or D23 and C5. Preferably the weight ratio of dyes "C" to dyes "D" is 9:3.

The compounding ratio of the cyan thiazolylazoaniline dyes according to general formula (I) with the cyan indoaniline dyes of general formula (II) or/and with the cyan azomethine dyes of general formula (III) in the cyan dye mixture is properly from 5 to 60 % by weight for the cyan dyes of formula (I), the balance being completed with dyes of formula II or III, or with mixtures of them in all proportions.

Yellow dyes for use together with the dyes of formula (I), (II) and/or (III) for obtaining green colored image areas include the yellow dyes described in EP 400706, EP 432829, EP 432313, EP 432314, U.S. Pat. Nos. 4,816,435, 5,043,316 and 4,833,123. These yellow dyes are then contained in another area (a yellow dye area) of the present dye-donor element.

Examples of suitable yellow dyes are

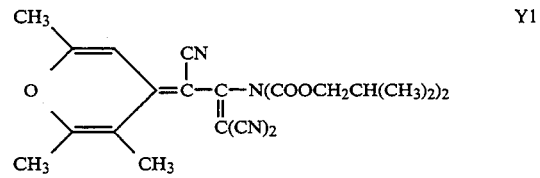

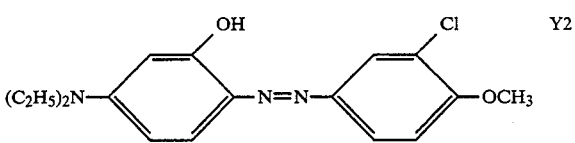

Other yellow dyes especially well suited for use in three color materials are yellow dyes of the following general formula (IV):

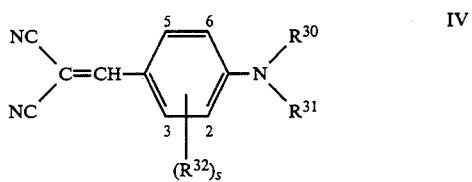

wherein:

$R^{30}$ and $R^{31}$ (same or different) represent hydrogen, an alkyl group, a cycloalkyl group or an aryl group, which groups may be substituted, or $R^{30}$ and $R^{31}$ may be joined together to form a 5- or 6-membered heterocyclic ring system, which ring may be substituted, or each of $R^{30}$ and $R^{31}$ can be joined to the carbon atom of the aromatic ring at a position ortho to the position of attachment of the anilino nitrogen to form a 5- or 6-membered ring, which ring may be substituted;

$R^{32}$ represents a substituent, e.g. alkyl, CN, alkoxy, thioalkoxy, halogen, $NO_2$, acylamino;

s represents 0, 1, 2, 3 or 4, the $R^{32}$ substituents may be the same or different when s is greater than 1.

Examples of yellow dyes according to general formula (IV) are listed in table 4 below, Y3 being particularly preferred.

TABLE 4

| $R^{30}$ | $R^{31}$ | $R^{32}$ | |
|---|---|---|---|
| $C_2H_5$ | ![biphenyl]—$OC_2H_4$— | 3 $CH_3$— | Y3 |
| $C_4H_9$ | ![phenyl]— | — | Y4 |

TABLE 4-continued

| $R^{30}$ | $R^{31}$ | | |
|---|---|---|---|
| $C_4H_9$ | $CH_3O-\phantom{a}\phenyl\phantom{a}-$ | — | Y5 |
| $\phenyl$ | $\phenyl$ | — | Y6 |
| $C_4H_9-$ | $(CH_3)_2CH-O-\phenyl-$ | — | Y7 |
| $C_2H_5$ | $C_2H_5-$ | — | Y8 |
| $C_4H_9-$ | $(CH_3)_2CH-O-\phenyl-$ | 3 $CH_3O-$ | Y9 |

Magenta dyes for use together with the cyan dyes of the present invention in three color materials are described in U.S. Pat. No. 4,159,192, EP 279467, EP 227095 and EP 441396.

Examples of suitable magenta dyes are

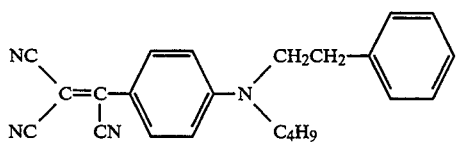

M1

Instead of being used as a dye mixture in a cyan colored dye-donor element the present mixture of cyan dyes can also be used in a black colored dye-donor element in admixture with magenta dyes and yellow dyes. Suitable dyes to be used in such a black-colored dye-donor element are described in EP 453020 and in our copending European patent applications filed on the same day as the present patent application.

The dye layer of the dye-donor element of the present invention is formed preferably by adding the dyes, the polymeric binder medium, and other optional components to a suitable solvent or solvent mixture, dissolving or dispersing the ingredients to form a coating composition that is applied to a support, which may have been provided first with an adhesive or subbing layer, and dried.

The dye layer thus formed has a thickness of about 0.2 to 5.0 μm, preferably 0.4 to 2.0 μm, and the amount ratio of dye to binder is between 9:1 and 1:3 by weight, preferably between 2:1 and 1:2 by weight.

As polymeric binder the following can be used: cellulose derivatives, such as ethyl cellulose, hydroxyethyl cellulose, ethylhydroxy cellulose, ethylhydroxyethyl cellulose, hydroxypropyl cellulose, methyl cellulose, nitrocellulose, cellulose acetate formate, cellulose acetate hydrogen phthalate, cellulose acetate, cellulose acetate propionate, cellulose acetate butyrate, cellulose acetate pentanoate, cellulose acetate benzoate, cellulose triacetate; vinyl-type resins and derivatives, such as polyvinyl alcohol, polyvinyl acetate, polyvinyl butyral, copolyvinyl butyral-vinyl acetal-vinyl alcohol, polyvinyl pyrrolidone, polyvinyl acetoacetal, polyacrylamide; polymers and copolymers derived from acrylates and acrylate derivatives, such as polyacrylic acid, polymethyl methacrylate and styrene-acrylate copolymers; polyester resins; polycarbonates; copolystyrene-acrylonitrile; polysulfones; polyphenylene oxide; organosilicones, such as polysiloxanes; epoxy resins and natural resins, such as gum arabic. Preferably cellulose acetate butyrate or copolystyrene-acrylonitrile is used as binder for the dye layer of the present invention.

The coating layer may also contain other additives, such as curing agents, preservatives, organic or inorganic fine particles, dispersing agents, antistatic agents, defoaming agents, viscosity controlling agents, etc., these and other ingredients being described more fully in EP 133011, EP 133012, EP 111004 and EP 279467.

Especially preferred organic fine particles for use in the dye layer are polyethylene, polypropylene, or amide wax particles.

Any material can be used as the support for the dye-donor element provided it is dimensionally stable and capable of withstanding the temperatures involved, up to 400° C. over a period of up to 20 msec, and is yet thin enough to transmit heat applied on one side through to the dye on the other side to effect transfer to the receiver sheet within such short periods, typically from 1 to 10 msec. Such materials include sheets or films of polyester such as polyethylene terephthalate, polyamide, polyacrylate, polycarbonate, cellulose ester, fluorinated polymer, polyether, polyacetal, polyolefin, polyimide, glassine paper and condenser paper. Preference is given to a support comprising polyethylene terephthalate. In general, the support has a thickness of 2 to 30 μm.

The support may also be coated with an adhesive or subbing layer, if desired. A suitable subbing layer for the dye layer contains a copolyester of terephthalic acid, isophthalic acid, ethylene glycol and neopentyl glycol and optionally 1,2-dihydroxybenzene.

The dye layer of the dye-donor element may be coated on the support or printed thereon by a printing technique such as a gravure process.

A dye-barrier layer comprising a hydrophilic polymer may also be employed in the dye-donor element between its support and the dye layer to improve the dye transfer densities by preventing wrong-way transfer of dye towards the support. The dye barrier layer may contain any hydrophilic material which is useful for the intended purpose. In general, good results have been obtained with gelatin, polyacryl amide, polyisopropyl acrylamide, butyl methacrylate grafted gelatin, ethyl methacrylate grafted gelatin, ethyl acrylate grafted gelatin, cellulose monoacetate, methyl cellulose, polyvinyl alcohol, polyethylene imine, polyacrylic acid, a mixture of polyvinyl alcohol and polyvinyl acetate, a mixture of polyvinyl alcohol and polyacrylic acid or a mixture of cellulose monoacetate and polyacrylic acid. Suitable dye barrier layers have been described in e.g. EP 227091 and EP 228065. Certain hydrophilic polymers, for example those described in EP 227091, also have an adequate adhesion to the support and the dye layer, thus eliminating the need for a separate adhesive or subbing layer. These particular hydrophilic polymers used in a single layer in the donor element thus perform a dual function, hence are referred to as dye-barrier/-subbing layers.

Preferably the reverse side of the dye-donor element is coated with a slipping layer to prevent the printing head from sticking to the dye-donor element. Such a slipping layer would comprise a lubricating material such as a surface active agent, a liquid lubricant, a solid lubricant or mixtures thereof, with or without a polymeric binder. The surface active agents may be any agents known in the art such as carboxylates, sulfonates, phosphates, aliphatic amine salts, aliphatic quaternary ammonium salts, polyoxyethylene alkyl ethers, polyethylene glycol fatty acid esters, fluoroalkyl $C_2-C_{20}$ aliphatic acids. Examples of liquid lubricants include silicone oils, synthetic oils, saturated hydrocarbons and glycols. Examples of solid lubricants include various higher alcohols such as stearyl alcohol, fatty acids and fatty acid esters. Suitable slipping layers are described in e.g. EP 138483, EP 227090, U.S. Pat. Nos. 4,567,113, 4,572,860, 4,717,711.

Preferably the reverse side of the support is coated with the following subsequent layers in order to prevent sticking from the dye-donor element to the thermal head: a subbing layer, a heat-resistant layer and a toplayer. Suitable subbing layers can be choosen from the classes of polyester resins, polyurethane resins, polyester urethane resins, modified dextrans, modified cellulose, and copolymers comprising recurring units such as i.a. vinylchloride, vinylidenechloride, vinylacetate, acrylonitrile, methacrylate, acrylate, butadiene and styrene (e.g. poly(vinylidenechloride-co-acrylonitrile)). Especially preferred are polyester subbing layers such as described in European patent application no. 92200907.1. Suitable heat-resistant layers are described in European patent applications nos 91202071.6 (polycarbonates) and 92201619.1 (polyethers). The separate toplayer comprises at least one lubricant e.g. a polyether-polysiloxane copolymer.

The support for the receiver sheet that is used with the dye-donor element may be a transparant film of e.g. polyethylene terephthalate, a polyether sulfone, a polyimide, a cellulose ester or a polyvinyl alcohol-co-acetal. The support may also be a reflective one such as baryta-coated paper, polyethylene-coated paper or white polyester i.e. white-pigmented polyester. Blue-colored polyethylene terephthalate film can also be used as support.

To avoid poor adsorption of the transferred dye to the support of the receiver sheet this support must be coated with a special surface, a dye-image-receiving layer, into which the dye can diffuse more readily. The dye-imaging-receiving layer may comprise, for example, a polycarbonate, a polyurethane, a polyester, a polyamide, polyvinyl chloride, polystyrene-co-acrylonitrile, polycaprolactone or mixtures thereof. The dye-image receiving layer may also comprise a heat-cured product of poly(vinylchloride-co-vinylacetate-co-vinylalcohol) and polyisocyanate. Suitable dye-receiving layers have been described in e.g. EP 133011, EP 133012, EP 144247, EP 227094, EP 228066.

In order to improve the light resistance and other stabilities of recorded images, UV absorbers, singlet oxygen quenchers such as HALS-compounds (Hindered Amine Light Stabilizers) and/or antioxidants may be incorporated into the receiving layer.

The dye layer of the dye-donor element or the dye-image-receiving layer of the receiver sheet may also contain a releasing agent that aids in separating the dye-donor element from the dye-receiving element after transfer. The releasing agents can also be applied in a separate layer on at least part of the dye layer or of the receiving layer. For the releasing agent solid waxes, fluorine- or phosphate-containing surfactants and silicone oils are used. Suitable releasing agents are described in e.g. EP 133012, JP 85/19138, EP 227092.

The dye-donor elements according to the invention are used to form a dye transfer image. Such a process comprises placing the dye layer of the donor element in face-to-face relation with the dye-receiving layer of the receiver sheet and imagewise heating from the back of the donor element. The transfer of the dye is accomplished by heating for about several milliseconds at a temperature of 400° C.

When the process is performed for but one single color, a monochrome dye transfer image is obtained. A multicolor image can be obtained by using a donor element containing three or more primary color dyes and sequentially performing the process steps described above for each color. The above sandwich of donor element and receiver sheet is formed on three occasions during the time when heat is applied by the thermal printing head. After the first dye has been transferred, the elements are peeled apart. A second dye-donor element (or another area of the donor element with a different dye area is then brought in register with the dye receiving element and the process repeated. The third color an optionally further colors are obtained in the same manner.

In addition to thermal heads, laser light, infrared flash or heated pens can be used as the heat source for supplying heat energy. Thermal printing heads that can be used to transfer dye from the dye-donor elements of the present invention to a receiver sheet are commercially available. In case laser light is used, the dye layer or another layer of the dye element has to contain a compound that absorbs the light emitted by the laser and converts it into heat, e.g. carbon black.

Alternatively, the support of the dye-donor element may be an electrically resistive ribbon consisting of, for example, a multi-layer structure of a carbon loaded polycarbonate coated with a thin aluminum film. Current is injected into the resistive ribbon by electrically adressing a print head electrode resulting in highly localized heating of the ribbon beneath the relevant electrode. The fact that in this case the heat is generated directly in the resistive ribbon and that it is thus the ribbon that gets hot leads to an inherent advantage in printing speed using the resistive ribbon/electrode head technology compared to the thermal head technology where the various elements of the thermal head get hot and must cool down before the head can move to the next printing position.

The following examples are provided to illustrate the invention in more detail without limiting, however, the scope thereof.

EXAMPLE 1

Lightfastness of cyan dye mixtures

Receiver sheets were prepared as follows:

A 175 μm thick polyethylene terephthalate film was coated from methyl ethyl ketone with a dye image receiving layer which contains 3.6 g/m² poly(vinylchloride-co-vinylacetate-co-vinylalcohol) (Vinylite VAGD supplied by Union Carbide), 0.336 g/m² diisocyanate (Desmodur VL supplied by Bayer AG) and 0.2 g/m² hydroxy modified polydimethylsiloxane (Tegomer HSI 2111 supplied by Goldschmidt).

Dye-donor elements were prepared as follows:

A solution comprising the dye(s) as given in table 5 (amounts are given in wt %) and 10 wt % of poly(styrene-co-acrylonitrile) (Luran 3885. BASF, Germany) as binder in methyl ethyl ketone as solvent was prepared. From this solution a dye layer having a wet thickness of 10 μm was coated on a 6 μm thick polyethylene terephthalate film support provided with a conventional subbing layer. The resulting dye layer was dried by evaporation of the solvent.

The opposite side of the film support was coated with a subbing layer of a copolyester comprising ethylene glycol, adipic acid, neopentyl glycol, terephthalic acid, isophthalic acid and glycerol. On top of this subbing layer, a heat-resistant layer was casted from methylethyl ketone, containing 0.5 g/m² of a polycarbonate having the following structure:

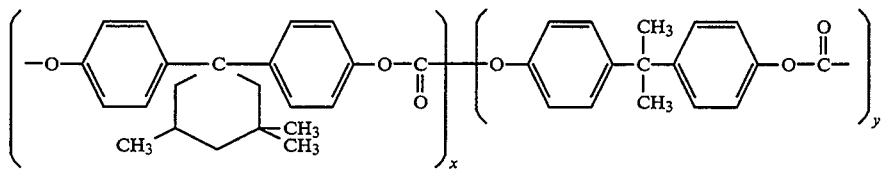

wherein x=55 mol % and y=45 mol %.

On top of said polycarbonate, a topcoat layer of polyether modified polydimethylsiloxane (Tegoglide 410, Goldschmidt) was applied from isopropanol.

The dye-donor element was printed in combination with the receiving sheet in a Mitsubishi colour video printer CP100E.

The receiver sheet was separated from the dye-donor element and the color density of the recorded image was measured by means of a Macbeth TR densitometer behind a red filter in Status A mode.

This experiment was repeated for each of the dye mixtures identified in table 5 below.

Thereafter, the receiver sheet was subjected to irradiation by a Xenon lamp of 150 klux for 16 hours, the densities were measured again and the density loss (in %) was calculated and given in table 5.

TABLE 5

| Cyan III | % | Cyan II | % | Cyan I | % | Density loss 16 h Xe 150 | Remarks |
|---|---|---|---|---|---|---|---|
|  |  | C5 | 12 | — |  | 25 | comparison |
|  |  | C5 | 9 | D14 | 3 | 20 | invention |
|  |  | C5 | 9 | D4 | 3 | 16 | invention |
|  |  | C5 | 9 | D6 | 3 | 20 | invention |

TABLE 5-continued

| Cyan III | % | Cyan II | % | Cyan I | % | Density loss 16 h Xe 150 | Remarks |
|---|---|---|---|---|---|---|---|
|  |  | C5 | 9 | D5 | 3 | 19 | invention |
|  |  | C5 | 9 | D2 | 3 | 16 | invention |
|  |  | C5 | 9 | D1 | 3 | 16 | invention |
|  |  | C5 | 9 | D3 | 3 | 19 | invention |
|  |  | C27 | 10 | — |  | 6 | comparison |
|  |  | C27 | 7 | D1 | 3 | 4 | invention |
| C30 | 6 | C5 | 6 | — |  | 15 | comparison |
| C30 | 6 | C5 | 3 | D14 | 3 | 9 | invention |
| C30 | 3 | C5 | 6 | D14 | 3 | 4 | invention |
| C31 | 12 | — |  | — |  | 5 | comparison |
| C31 | 9 | — |  | D14 | 3 | 1 | invention |

From the results it is clear that the light stability of the cyan prints according to the invention is increased.

EXAMPLE 2

Lightfastness in the green colored image area

Receiver sheets were prepared as described above in example 1.

Cyaan dye-donor elements were prepared as described in example 1 containing cyan dyes as listed in table 6 below.

Yellow dye-donor elements were prepared in an analoguous way as described in example 1 containing yellow dyes as listed in table 6 below.

The cyan dye-donor element was printed in combination with the receiver sheet and subsequently after separation of donor and receiver the yellow dye-donor element was printed in combination with the same receiver sheet in register so as to obtain a green colored image.

The receiver sheet was separated from the yellow dye-donor element and the color density of the recorded green image was measured by means of a Macbeth TR 924 densitometer behind red and blue filter.

Thereafter the receiver sheet was subjection to irradiation by a Xenon lamp of 150 klux for 16 hours, the densities were measured again and subsequently the density loss was calculated.

The results are given in table 6.

TABLE 6

| Cyan III | % | Cyan II | % | Cyan I | % | Yellow | % | Density loss 16 h Xe 150 R | B | Remarks |
|---|---|---|---|---|---|---|---|---|---|---|
|  |  | C5 | 12 | — |  | Y3 | 12 | 53 | 15 | comparison |
|  |  | C5 | 9 | D14 | 3 | Y3 | 12 | 43 | 11 | invention |
|  |  | C5 | 9 | D4 | 3 | Y3 | 12 | 35 | 7 | invention |
|  |  | C5 | 9 | D5 | 3 | Y3 | 12 | 44 | 8 | invention |
|  |  | C5 | 9 | D2 | 3 | Y3 | 12 | 43 | 9 | invention |
|  |  | C5 | 9 | D1 | 3 | Y3 | 12 | 33 | 6 | invention |
|  |  | C5 | 9 | D3 | 3 | Y3 | 12 | 50 | 10 | invention |
|  |  | C5 | 12 | — |  | Y1 | 10 | 58 | 33 | comparison |
|  |  | C5 | 9 | D1 | 3 | Y1 | 10 | 50 | 16 | invention |
| C30 | 12 | — |  | — |  | Y3 | 12 | 25 | 4 | comparison |
| C30 | 9 | — |  | D14 | 3 | Y3 | 12 | 19 | 0 | invention |
| C30 | 6 | C5 | 6 | — |  | Y3 | 12 | 40 | 9 | comparison |
| C30 | 6 | C5 | 3 | D14 | 3 | Y3 | 12 | 32 | 6 | invention |
| C30 | 3 | C5 | 6 | D14 | 3 | Y3 | 12 | 34 | 6 | invention |
| C31 | 12 | — |  | — |  | Y3 | 12 | 65 | 16 | comparison |

TABLE 6-continued

| Cyan III | % | Cyan II | % | Cyan I | % | Yellow | % | Density loss 16 h Xe 150 R | B | Remarks |
|---|---|---|---|---|---|---|---|---|---|---|
| C31 | 9 | — | | D2 | 3 | Y3 | 12 | 50 | 9 | invention |
| C31 | 9 | — | | D14 | 3 | Y3 | 12 | 24 | 4 | invention |
| C31 | 12 | — | | — | | Y2 | 12 | 74 | 91 | comparison |
| C31 | 9 | — | | D14 | 3 | Y2 | 12 | 43 | 77 | invention |
| | | C5 | 9.5 | D17 | 2.5 | Y3 | 12 | 49 | 9 | invention |
| C31 | 9.5 | — | | D17 | 2.5 | Y3 | 12 | 20 | 4 | invention |

It is clear that the catalytic fading effects in the green dye image area are decreased by using a cyan dye mixture according to the present invention.

EXAMPLE 3

Lightfastness in black colored dye image areas

Receiver sheets were prepared as described above in example 1.

Cyaan dye-donor elements were prepared as described in example 1 containing cyan dyes as listed in table 7 below.

Yellow dye-donor elements were prepared in an analoguous way as described in example 1 containing yellow dyes as listed in table 7 below.

Magenta dye-donor elements were prepared in an analoguous way as described in example 1 containing magenta dyes as listed in table 7 below.

The cyan dye-donor element was printed in combination with the receiver sheet and subsequently after separation of donor and receiver the yellow dye-donor element was printed in combination with the same receiver sheet in register and subsequently after separation of donor and receiver the magenta dye-donor element was printed in combination with the same receiver in register so as to obtain a black colored image.

The receiver sheet was separated from the magenta dye-donor element and the color density of the recorded black image was measured by means of a Macbeth TR 924 densitometer behind red, blue, green and visual filter.

Thereafter the receiver sheet was subjection to irradiation by a Xenon lamp of 150 klux for 16 hours, the densities were measured again and subsequently the density loss was calculated.

The results are given in table 7.

TABLE 7

| Cyan | % | Azo cyan I | % | Yellow | % | Magenta | % | Density loss 16 h Xe 150 Vis. | R | Gr | B | Remarks |
|---|---|---|---|---|---|---|---|---|---|---|---|---|
| C5 | 12 | — | | Y3 | 12 | M1 | 10 | 28 | 47 | 16 | 9 | comparison |
| C5 | 9 | D14 | 3 | Y3 | 12 | M1 | 10 | 15 | 29 | 9 | 4 | invention |
| C31 | 12 | — | | Y3 | 12 | M1 | 10 | 60 | 83 | 38 | 30 | comparison |
| C31 | 9 | D14 | 3 | Y3 | 12 | M1 | 10 | 30 | 45 | 18 | 6 | invention |
| C31 | 12 | — | | Y2 | 12 | M1 | 10 | 75 | 94 | 59 | 85 | comparison |
| C31 | 9 | D14 | 3 | Y2 | 12 | M1 | 10 | 40 | 58 | 20 | 59 | invention |

It is clear that also in the black colored image areas the catalytic fading effects are decreased by using mixtures of cyan color dyes according to the invention.

We claim:

1. Dye-donor element for thermal dye sublimation transfer comprising a support provided with a dye layer containing a cyan indoaniline dye and/or a cyan azomethine dye and a binder, characterized in that said dye layer further contains a cyan thiazolylazoaniline dye.

2. Dye-donor element according to claim 1, wherein said cyan thiazolylazoaniline dye corresponds to the following general formula (I):

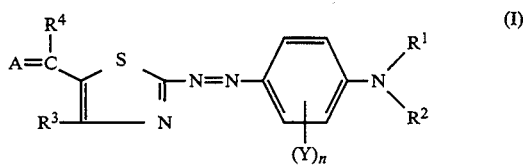

wherein
A represents O, N—$R^5$, $CR^6R^7$;
Y represents any substituent;
n represents 0, 1, 2, 3 or 4, the Y substituents being the same or different when n is greater than 1;
each of $R^1$ to $R^2$ independently represent hydrogen, an alkyl group, a cycloalkyl group or an aryl group, or $R^1$ and $R^2$ may be joined together to form a 5- or 6-membered heterocyclic ring system or each of $R^1$ and $R^2$ independently can be joined to the carbon atom of the aromatic ring at a position ortho to the position of attachment of the anilino nitrogen to form a 5- or 6-membered ring,
$R^3$ represents a substituent;
$R^4$ represents hydrogen or an electron withdrawing substituent;
$R^5$ represents H, CN, $NR^8R^9$, $OR^8$, $OCOR^8$, $OCOOR^8$, $OCONR^8R^9$, $OSO_2R^8$, $OPO(OR^8)(OR^9)$;
$R^6$ and $R^7$ independently represent an electron withdrawing group;
$R^8$ and $R^9$ independently represent hydrogen, alkyl, aryl, cycloalkyl or $R^8$ and $R^9$ together represent the atoms necessary for completing a heterocyclic nucleus or heterocyclic nucleus.

3. Dye-donor element according to claim 2, wherein $R^3$ represents halogen, $OR^{10}$ or $SR^{10}$ with $R^{10}$ representing hydrogen, alkyl, cycloalkyl, aryl.

4. Dye-donor element according to claim 3, wherein $R^1$ and $R^2$ both represent an alkyl group, $R^3$ represents chlorine or methoxy, $R^4$ represents hydrogen, A represents $C(CN)_2$ and n represents 0.

5. Dye-donor element according to claim 1, wherein said cyan indoaniline dye corresponds to the following general formula (II):

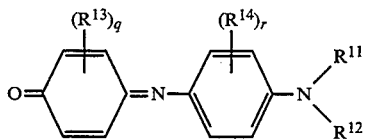

wherein:
- $R^{11}$ and $R^{12}$ independently represent hydrogen, an alkyl group, a cycloalkyl group, an aryl group, an allyl group or an alkenyl group, or $R^{11}$ and $R^{12}$ together with the nitrogen to which they are attached form the necessary atoms to close a 5- or 6-membered heterocyclic ring, or $R^{11}$ and/or $R^{12}$ together with the nitrogen to which they are attached and either or both carbon atoms of the phenyl ring ortho to said nitrogen atom form a 5- or 6 -membered heterocyclic ring,
- $R^{13}$ represents halogen, hydroxy, cyano, an alkyl group, a cycloalkyl group, an aryl group, an alkoxy group, an aryloxy group, an alkylthio group, an arylthio group, an amino group, a di(alkyl or aryl)amino group, an alkylcarbonylamino group, an arylcarbonylamino group, an arylsulfonylamino group, an alkoxycarbonylamino group, an aryloxycarbonylamino group, an alkylthiocarbonylamino group, an arylthiocarbonylamino group, an alkylphosphoramidate group, an arylphosphoramidate group, an alkylphosphonamidate group, an arylphosphonamidate group, an alkylaminocarbonyl group or an arylaminocarbonyl group, or $R^{13}$ represents the necessary atoms to close an alicyclic or aromatic or heterocyclic ring fused-on the phenylene ring;
- q represents 0, 1, 2, 3 or 4, the $R^{13}$ substituents may be the same or different when q is greater than 1;
- $R^{14}$ can have any of the significances given to $R^{13}$ or can represent the necessary atoms to close an alicyclic or aromatic or heterocyclic ring fused-on the phenyl ring;
- r represents 0, 1, 2, 3 or 4, the $R^{14}$ substituents may be the same or different when r is greater than 1.

6. Dye-donor element according to claim 1, wherein said other cyan azomethine dye corresponds to general formula (III)

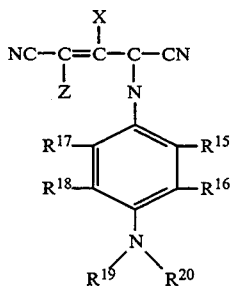

wherein:
- X represents $OR^{21}$ or $NR^{22}R^{23}$ or CN;
- Z represents CN, $COOR^{24}$ or $CONR^{25}R^{26}$;
- $R^{15}$, $R^{16}$, $R^{17}$ and $R^{18}$ each independently represent hydrogen substituted or unsubstituted alkyl, cycloalkyl, substituted or unsubstituted aryl, alkoxy, substituted or unsubstituted aryloxy, carbonamido, sulfamido, hydroxy, halogen, $NH\text{---}SO_2R^{27}$, $NH\text{---}COR^{27}$, $OSO_2R^{27}$, $OCOR^{27}$, or $R^{15}$ and $R^{16}$ together and/or $R^{17}$ and $R^{18}$ together represent the necessary atoms to close (a) ring(s) fused-on the benzene ring or $R^{16}$ and/or $R^{18}$ together with $R^{20}$ and/or $R^{19}$ represent the necessary atoms to close a heterocyclic ring fused-on the benzene ring;
- $R^{19}$ and $R^{20}$ each independently represent hydrogen, alkyl, cycloalkyl, aryl, a substituted or unsubstituted heterocyclic group or $R^{19}$ and $R^{20}$ together represent the necessary atoms to close a heterocyclic ring or $R^{20}$ and/or $R^{19}$ together with $R^{16}$ and/or $R^{18}$ represent the necessary atoms to close a heterocyclic ring fused-on the benzene ring;
- $R^{21}$ represents hydrogen, alkyl, cycloalkyl, aryl, $SO_2R^{27}$, $COR^{27}$, $CSR^{27}$, $POR^{27}R^{28}$;
- $R^{22}$ and $R^{23}$ each independently represent hydrogen, alkyl, cycloalkyl, aryl, amino $SO_2LR^{27}$, $COR^{27}$, $CSR^{27}$, $POR^{27}R^{28}$, or $R^{22}$ and $R^{23}$ together represent the necessary atoms to close a heterocyclic ring, including a heterocyclic ring with an aliphatic or aromatic ring fused-on;
- $R^{24}$, $R^{25}$ and $R^{26}$ each independently represent hydrogen, alkyl, cycloalkyl, aryl, or $R^{25}$ and $R^{26}$ together represent the necessary atoms to close a heterocyclic ring;
- $R^{27}$ and $R^{28}$ each independently represent alkyl, cycloalkyl, alkenyl, aralkyl, aryl, alkoxy, aryloxy, alkylthio, arylthio, amino, a heterocyclic group or $R^{27}$ and $R^{28}$ together represent the necessary atoms to close a 5- or 6-membered ring.

7. Dye-donor element according to claim 1, wherein the compounding ratio of the thiazolylazoaniline dyes in the cyan dye mixture is from 5 to 60% by weight.

8. Dye-donor element according to claim 1, wherein the dye layer contains polystyrene-co-acrylonitrile as binder.

9. Dye-donor element according to claim 1, wherein said dye layer consists of a repeating sequence of yellow, magenta and cyan dye areas and wherein said yellow dye area contains a yellow dye corresponding to general formula (IV)

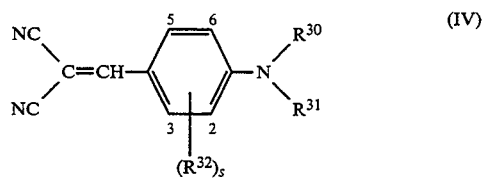

wherein:
- $R^{30}$ and $R^{31}$ independently represent hydrogen, an alkyl group, a cycloalkyl group or an aryl group, or $R^{30}$ and $R^{31}$ may be joined together to form a 5- or 6-membered heterocyclic ring system, or each of $R^{30}$ and $R^{31}$ can be joined to the carbon atom of the aromatic ring at a position ortho to the position of attachment of the anilino nitrogen to form a 5- or 6-membered ring;
- $R^{32}$ represents a substituent;
- s represents 0, 1, 2, 3 or 4, the $R^{32}$ substituents may be the same or different when s is greater than 1.

10. A method for making an image comprising the steps of (i) bringing the dye layer of a dye-donor element as defined in claim 1, 2, 3, 4, 5, 6, 7, 8 or 9 in face-to-face relationship with a dye-receiving layer of a receiver sheet and image-wise heating a thus obtained assemblage from the back of said dye donor element.

* * * * *